June 8, 1943.  W. N. HADLEY  2,321,482
CLOTH SHEARING MACHINE
Filed June 14, 1941   3 Sheets-Sheet 1

Inventor.
WILFRED N. HADLEY
by Robert K. Randall,
Atty.

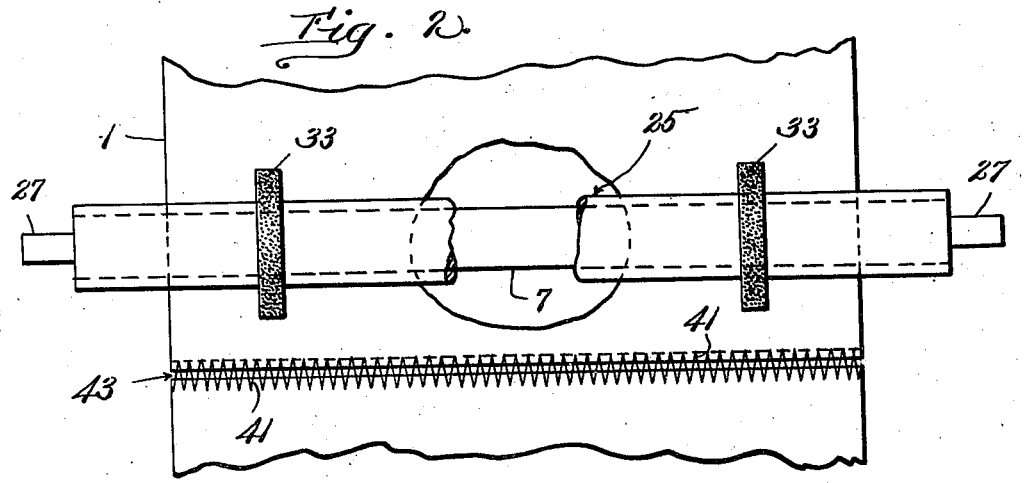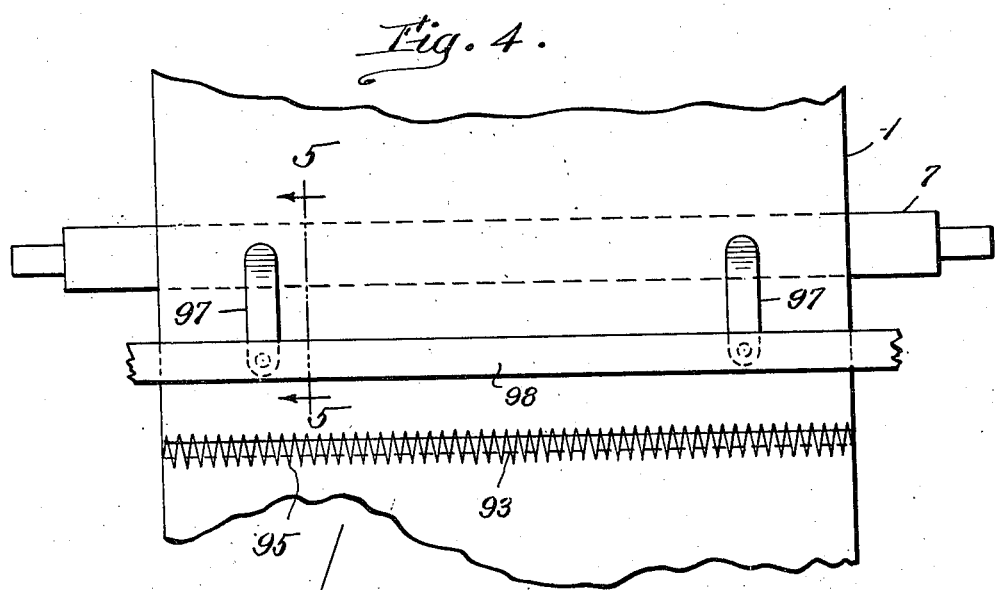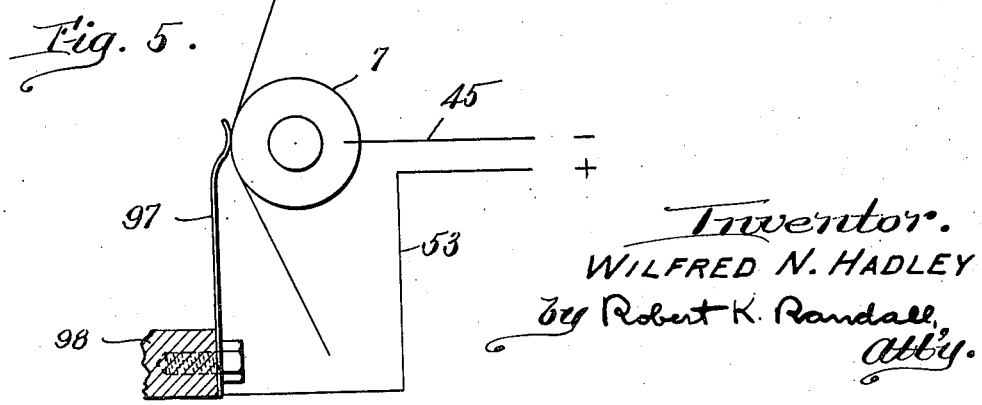

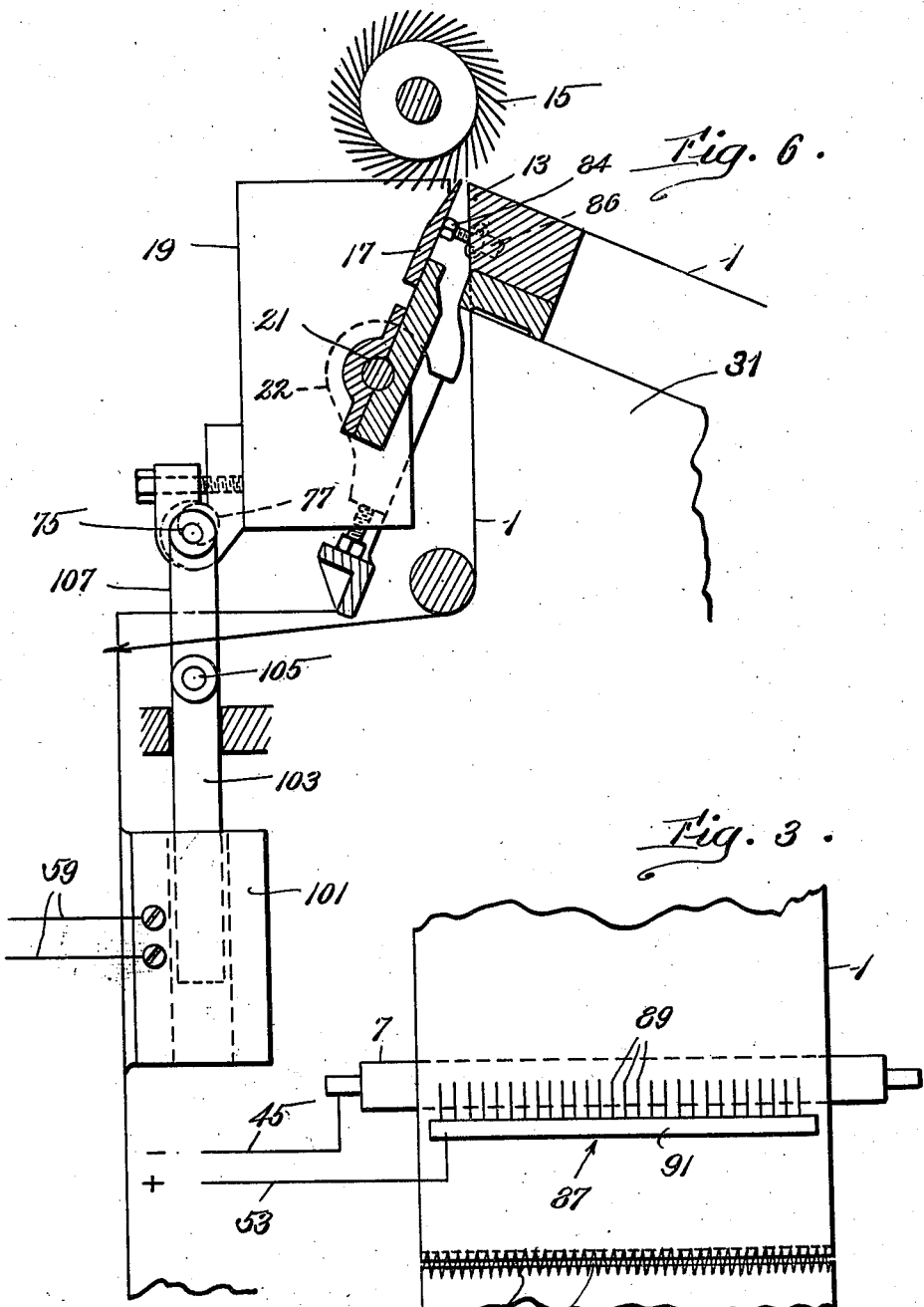

Patented June 8, 1943

2,321,482

UNITED STATES PATENT OFFICE 2,321,482

CLOTH SHEARING MACHINE

Wilfred N. Hadley, Springfield, Vt., assignor to Parks and Woolson Machine Company, Springfield, Vt., a corporation Application June 14, 1941, Serial No. 398,033

20 Claims. (Cl. 26—17)

This invention relates to cloth-shearing machines utilizing rotary shearing blades coacting with stationary ledger blades to shear the protruding fibres at the surface of the cloth to a uniform level of extent. For this purpose, the cloth is run rapidly through the machine and past the shearing devices in flat and open relation, the cloth being supported in close proximity to these coacting blades by means of a rest solidly supporting the cloth at the shearing point, the spacing between this rest and the shearing blades being adjustable to suit the thickness of the cloth and the degree of shearing desired, and in practically all cases being so close that the increase in thickness of the traveling web occasioned by the practice of joining one piece or cut of cloth to the succeeding piece will result in cutting and damaging the cloth or injuring the shearing blade if allowed to enter this narrow space. To prevent this injury, it is common to provide means for automatically increasing this spacing either by lifting the knives or lowering the rest to remove the cloth from the range of the blades at the vicinity of the seam.

Obviously, it is desirable to reduce the length of cloth thus skipped by the knives, and hence unshorn, to the smallest possible extent, and at the same time to make sure that the seam is untouched by the knives. On account of the rapidity of travel of the cloth and the unavoidable time-lag in separating the blades from the rest or vice versa, a mechanical problem is raised which has not yet been solved by prior structures in a manner obviating all room for further improvement. In certain widely used seam-protecting devices of this sort, the increase in thickness of the web at the seam, purposely amplified sometimes by stitching with thick thread, has been relied on to detect the approach of the seam and correspondingly to lift the blades or drop the rest; but this method of operation causes the devices to respond also to knots, slubs, bunches, or other accidental thickenings or protrusions, thus needlessly suspending the shearing. Further, this false initiation of the cycle of thus suspending the shearing had the serious drawback in many instances of rendering the machine incapable of responding to the actual approach and passage of the seam itself when such occurred while this cycle was in progress, with the result that the shearing was resumed just in time to involve the seam and cause the very injury guarded against at such length.

With the object of avoiding these and other drawbacks in the prior devices, and of providing a new and improved method and apparatus for use in single and multiple cloth shearing machines for protecting the seams and the knives from injury, which shall be simpler to build and to adjust and surer in its operation, the present invention is contrived to utilize the novel principle of transmitting a detecting or actuating impulse through the cloth or through the path thereof as the end of the piece of cloth or any given intermediate point therein passes by the detecting point. This novel principle admits of being utilized in a number of different ways, including the method of interrupting the continuity of the traveling web between successive pieces of cloth long enough to let a mechanical feeler member reach through the plane of travel of the cloth to transmit a mechanical or electrical impulse to suitable receiving elements so as to actuate the blade-lifting or rest-dropping means, as well as the method of attaching to the cloth or inserting in the cloth at the seam joining successive pieces or at any other desired point an element which will perform the same transmitting function while being of such a nature as not to injure the knives as it passes the latter.

A preferred form employing the first of the two methods just recited comprises fine wire feeler members continuously pressing against one surface of the cloth where the other surface of the latter is supported by a platen or roll of metal, these two parts forming terminals or electrodes in an electrical circuit which when closed causes the raising of a pair of cooperating shearing blades or the dropping of a cloth-rest; in this case, the meeting ends of two adjacent pieces of cloth are joined in spaced relation, instead of being lapped or butted, by stitches which are long and loose and spaced widely enough apart so that the feeler wires can reach through the seam and the space purposely left between the two pieces of cloth to make a momentary contact with the other electrode or terminal and thus close the circuit to initiate the suspension of the shearing. Suitable time-delay devices of conventional form are used to adjust the time of occurrence of the actual stopping of the shearing to the speed of travel of the cloth, so that the detector means just described can be located at any convenient interval in advance of the shearing point.

A preferred form employing the second of the two methods referred to uses the same type of electrical circuit to cause the suspension of the shearing, but inserts in or applies to the cloth an electrical conductor in the form of a metallic thread or wire, of soft and yielding nature such as tinsel, or even fine copper or aluminum or lead wire, which will not endanger the knives, but which when simultaneously engaged by electrodes or terminals of the circuit located at opposite surfaces of the cloth will close the circuit and transmit the desired impulse suspending the shearing. Either the described type of feeler and platen, or any other preferred type of electrodes simultaneously engaging opposite surfaces of the cloth at the same point in its length can be employed with the metallic threads, and when such thread containing a tinsel strand is used to join the adjacent ends of two successive pieces of cloth the ordinary lapped seam can of course be used. Additionally, the metallic element or stitching can be inserted at any point in the length of the cloth apart from the seam and in proper spaced relation therefrom with regard to the speed of travel of the cloth and the lag in operation of the shearing-suspending devices so as to obviate the need for other time-delay devices and itself serve to time the suspension to accord with the arrival of the seam at the shearing point. Likewise, an extension of the metallic stitching lengthwise of the cloth can be used to time the duration of the suspension of the shearing, by continuing the flow of current through the electrodes and the circuit for any length of time desired to afford ample clearance of the seam by the knives.

Other objects of the invention, and the manner of their attainment, are set forth in the following description.

Illustrative embodiments of the invention are shown in the accompanying drawings, in which:

Fig. 2 is a view of the feeler-roll of Fig. 1 which forms one terminal of the electric detector circuit actuating the blade-lifting mechanism of such figure, viewed from the left of Fig. 1, and showing also the seaming together of two adjacent pieces of cloth in spaced relation.

Fig. 3 shows an alternative form of feeler device for use in the construction shown in Fig. 1.

Fig. 4 is a view corresponding to Fig. 2 showing feeler means or terminals adapted to cooperate with metallic or other electrically-conducting threads utilized to form the seam joining adjacent pieces of cloth.

Fig. 5 is a view in section on line 5—5 of Fig. 4.

Fig. 6 is a vertical section of the shearing blades and associated parts of Fig. 1, including the swinging mounting for the shearing blades, showing alternative means of lifting the blades out of operative position.

Figure 1:
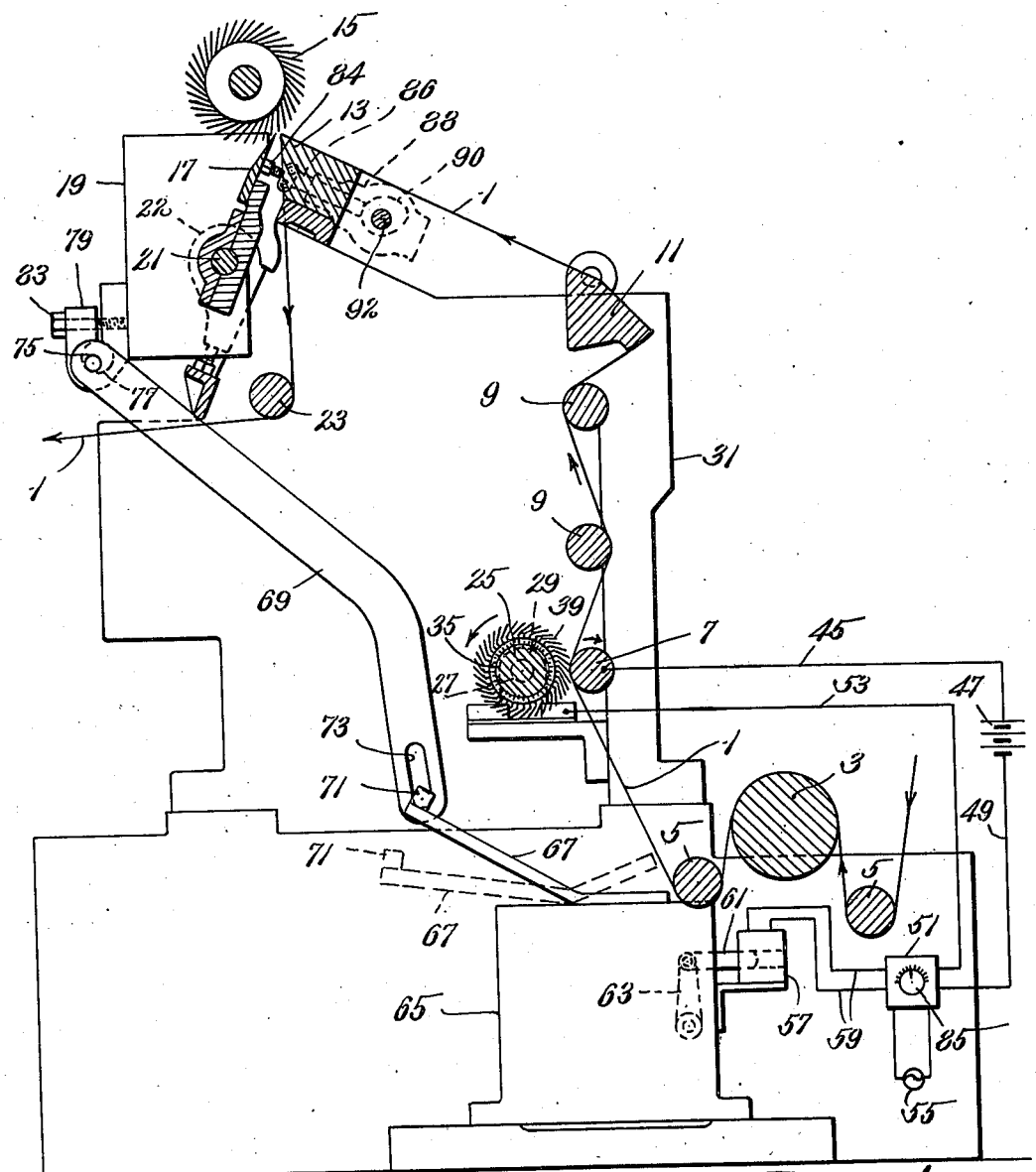
Fig. 1 is a vertical section of one stage of a multiple cloth shearing machine taken transversely of the shearing blades, with all parts not immediately concerned with the invention omitted, showing blade-lifting devices and an electric detecting circuit and actuating devices for the blade-lifting devices.

The drawings show only so much of the cloth-guiding and shearing instrumentalities of a standard and well known Parks & Woolson cloth shearing machine as is necessary for a complete understanding of the application of the invention thereto, most of the framework, guides, drives, and other familiar parts of the machine concerned with the invention being omitted with the understanding that they are or may be as usual.

In the embodiment of Fig. 1, the cloth 1 travels in the direction indicated by the arrows between draft roll 3 and guide rolls 5, thence around an arc of one feeler roll 7 comprising a feature of the invention, past guide rolls 9, over beam 11, and thence over the cloth rest 13, at the apex of which the shearing is effected by rotary helical blade 15 and cooperating ledger blade 17. Both blades are carried as usual by a rocking supporting structure having brackets 19 at each side of the machine, such structure with the knives borne thereby being pivotally mounted on shaft 21 which is mounted for rocking movement in journal-boxes 22 adjustable up or down on frame 31. This pivotal mounting provides for rocking movement of the supporting structure to bring the blades into or out of shearing engagement with the cloth as the latter passes around the acute angle of the rest 13. Thereafter the cloth passes down under guide roll 23 and onward to further processing, in many instances to a second or third shearing in the case of a multiple shear, in which event the devices and arrangements of Fig. 1 are in general duplicated one or more times in the same machine.

In accordance with the invention, at the point where the cloth is supported at one of its surfaces by a substantial arc of feeler roll 7, which latter is driven by the cloth, the opposite surface is subjected to contact with a second cooperating feeler device in the form of a roll 25 rotating on journals 27 suitably mounted in bearings 29 fixed on frame 31 of the machine, and clothed at spaced points in its length with brush-like sections 33 made of card clothing applied directly to the metallic surface of the roll so that the butts of the wires at the inner surface of the backing 35 are in perfect electrical contact with the roll. Ordinarily, it is adequate to use two narrow rings of card clothing spaced respectively as shown about ¼ of the way in from the location of the selvages of the widest cloth which the machine will shear, this arrangement taking care of any tolerable degree of bowing or slanting of the seam. Roll 25 is driven from any desired going part of the cloth shear so that the points of the wires 39 of the wire-clothed rings 33 fixed thereon travel in the same direction as the cloth at the point of contact of the wires with the cloth, and at a slightly faster speed than the cloth. Since the wires are bent to rake backward reversely to the direction of rotation at an angle of around 45°, and such angle is rendered even more acute through pressure of the wires against the cloth, their points brush over the surface of the cloth with relative motion thereto in the direction of travel of the cloth and without penetrating through the cloth so long as the latter remains continuous and unbroken in its extent.

In order to employ this type of feeler device, the adjacent ends of two successive pieces or lengths of cloth being shorn in the machine are joined together as shown in Fig. 2 in separate and spaced-apart relation, by long, loose stitches 41 extending mainly lengthwise of the cloth so that a space 43 of at least ⅛" or preferably more is left between the end of one piece of cloth and the beginning of the next piece. Thus, so long as the cloth passing between and engaged by the roll or platen 7 at one surface and the wire rings or brushes 33 at the other surface remains whole and unbroken in its extent the wires 39 are held out of contact with roll 7, but when the seam joining two successive pieces of cloth and made as described arrives between the two feeler rolls the tips of the wires 39 will reach through the stitches 41 and gap 43 and make quick but certain contact with roll 7.

The detector rolls 7 and 25 are mounted in bearings which are insulated electrically from the machine frame, and these rolls form the terminals or electrodes of an electrical circuit actuating the mechanically operated blade-lifting devices of the cloth shear. Thus, a wire 45 connects a source 47 of low-voltage electrical current with roll 7, the current passing by wire 49 to a delayed-action relay 51 and thence through wire 53 to the feeler roll 25, so that when this circuit is closed by the entry of the points of wires 39 between the end of one piece of cloth and the beginning of the next piece via the space 43 left between them so as to make contact with roll 7, the relay 51 will be actuated to transmit a more powerful current from a source 55 to a solenoid 57 by way of leads 59.

When the solenoid is energized, its armature 61 moves in a clockwise direction an arm 63 pivotally connected thereto and comprising the control member of a power take-off device enclosed in housing 65 and forming no part of the present invention, since it is the subject of U. S. Letters Patent No. 2,305,255 granted on Dec. 15, 1942, to John W. Hogue, to which reference may be had for a full understanding of its construction and operation. For present purposes it is sufficient to state that a rotating element continuously driven by a going part of the machine acts to rock a member 67 counterclockwise from its full line position to its dotted line position, and to hold it in such latter position so long as arm 63 is held over in its right-hand position by armature 61. Thereby a link 69, pivotally connected at 71 with member 67 with capacity for adjustment by means of slot 73, is pulled downwardly to rock the entire assembly comprising blades 15 and 17 and their supporting members and brackets 19, around center 21 as a pivot. This raises the blades 15 and 17 away from the cloth-rest 13 and the cloth passing over the acute edge thereof, thus suspending the shearing operation and also permitting the seam to pass over the cloth-rest without coming into range of the blades to be cut apart thereby or to cause any damage to the rapidly rotating blade 15. Incidentally, it is to be noted that the avoidance of the lapping of the fabric and of the consequent doubling of the thickness of the cloth at the seam makes it possible to avoid cutting the seam with a much smaller lift of the blades than heretofore, so that the shearing can be continued and resumed closer to the seam than in prior structures; also, that in case the rotary knife should engage the seam through incorrect setting of the time-delay control, it would shear through the slight resistance of the threads without damage to itself, instead of being broken as frequently occurred upon encountering the far greater resistance of a double thickness of the fabric itself such as is presented by the lapped seam used heretofore.

Link 69 is pivotally connected with the blade support by means of the reduced eccentrically disposed extremity 75 of a pin 77 held in a clamping bracket 79 fixed to bracket 19. Thus, a coarse adjustment of the effective length of the link 69 is made by fixing pivot-bolt 71 at a suitable point in the length of slot 73, and thereafter a fine adjustment is obtained by varying the angular position of pin 77 in bracket 79, such adjustment being retained by tightening a clamping screw 83. Thus the movement of rocking arm 67 is transmitted to the blade-carrying frame to move the later and lift the blades in properly timed relation.

The blade-carrying frame of which brackets 19 form parts returns to its working position under the force of gravity, the adjustment of the degree of approach of the blades to the cloth-rest 13 and consequently of the closeness of shearing effected on the cloth being controlled as in prior instances by the engagement of portions in connection with brackets 19 with the heads of screws 84. These screws 84 are fixed in plungers 86 sliding in guide-ways in housings 88 and butting against cams 90 fixed on opposite ends of a transverse shaft 92 whose angular position is determined in known manner by a worm-gear (not shown) thereon engaging with a worm manipulated by hand through an indicating dial mounted on its shaft.

Time-delay devices are incorporated in relay 51, to delay the actual lifting of the blades until the seam detected when passing between rolls 7 and 25 shall have arrived within an inch or two of the angle of cloth-rest 13. Adjustment of this delay to the speed of travel of the cloth is effected by the setting of rotatable control button 85 on the outside of relay 51. Likewise, provision is made in relay 51 for varying the duration of the time the circuit is held closed by the relay, so as to adjust the length of the interval during which the blades are out of shearing engagement with the cloth, and hence the length of cloth left unshorn at the seam; also, for receiving a second impulse from sections 33 in case of a bowed or diagonal seam, while in process of carrying out the first impulse, so that the blades will clear the lagging parts of the seam.

It is not necessary under all conditions to providing a rotating feeler roll having feeler wires which slant backwardly while traveling forwardly with the cloth and at a faster speed than the latter. Under certain conditions, and with many fabrics, a stationary comb 87 such as shown in Fig. 3 is substituted in the structure shown in Fig. 1 for the driven roll 25 with its wire-clothed section 33. This comb comprises a plurality of fine wire teeth or fingers 89 mounted in spaced and parallel relation along and in electrical connection with a metallic backing member 91 mounted in insulated relation in the frame after the manner of described roll 25, and connected to wire 53 to form one terminal of the circuit previously described. The wire fingers 89 have their extremities bent in toward the opposing roll or platen 7, and bear yieldingly against the surface of the traveling cloth where the latter is supported by roll 7, so that when the seam joining the spaced ends of the two successive pieces of cloth passes between these two terminals the tips of one of more wires will reach through the space 43 purposely left between the two pieces of cloth and make contact with roll 7 to close the circuit and actuate the blade-lifting devices as before described to suspend the shearing.

An embodiment of an alternative form of the invention in which an element attached to or incorporated in the cloth is utilized to close the circuit previously described which actuates the blade-lifting devices, is shown in Figs. 4 and 5. In this instance, the seam 93 between successive pieces of cloth is of the usual lapped type, but is stitched with a thread 95 which incorporates in its make-up one or more strands of tinsel or other metallic and hence electro-conducting material. Since this thread in forming the seam naturally extends through the fabric back and forth repeatedly from one surface to the other, it serves to close the circuit momentarily between two electrodes or terminals simultaneously engaging the same point in the length of the fabric from opposite sides, or at different points in the width of the fabric at the same side, or at different points in the length of the fabric from either or both sides. Hence, when the seam is formed with this electro-conducting thread, one or more simple metallic feeler-fingers 97 are substituted for feeler roll 25 or comb 87 in the structure of Fig. 1, bearing lightly against one surface of the traveling cloth 1 at a point or points where it is supported by roll 7 as before. The finger or fingers 97 are mounted on a metallic supporting bar 98 held in insulated supports in the machine frame, the bar being connected with lead 53 as were the corresponding two prior described feelers 25 and 87. When any part of the metallic thread 95 passes between and is simultaneously engaged by a finger 97 and roll 7 the circuit is closed to actuate the blade-lifting mechanism and suspend the shearing as described hereinbefore.

As is obvious, stitching with this metal-bearing, electro-conducting thread can be inserted in the fabric at any point in its length, to actuate the detecting and blade-lifting devices as desired. Hence, with a known speed of travel of the cloth and a known lag in the lifting of the blades after the solenoid 57 or other lifting devices are set in motion, it is easily possible to insert the electro-conductive stitching at the proper distance lengthwise of the fabric from any seam of any ordinary construction and stitched with regular, non-conducting thread, so as thus to time the suspension of the shearing to avoid cutting the seam; and by extending the stitching with metallic thread lengthwise of the fabric to continue the energizing of the actuating circuit so as to hold the blades lifted for any desired duration of travel needed to clear the seam, or for other purposes.

In Fig. 6 is shown a direct-acting structure in which the combined electric and mechanical blade-lifting devices of Fig. 1 are replaced by a single powerful solenoid 101 connected into the circuit which includes the wires 59 of Fig. 1 in place of the small solenoid 57 thereof. The armature 103 of solenoid 101 is pivotally connected at 105 with a link 107 which is pivotally connected to the extremity 75 of eccentric pin 77 of the parts shown in Fig. 1, the rest of the structure being identical with that described and operating in the same manner to rock the two blades and their supporting structure about pivot 21 to lift the blades and suspend the shearing. As before, the movement of the link 107 in the direction returning the blades to shearing position is limited by screw 84 in the end of plunger 86. The same rotation of adjusting pin 77 will control the effective length of link 107.

While I have illustrated and described certain forms in which the invention may be embodied, I am aware that many modifications may be made therein by any person skilled in the art, without departing from the scope of the invention as expressed in the claims. Therefore, I do not wish to be limited to the particular forms shown, or to the details of construction thereof, but What I do claim is:

1. In a cloth shear, in combination, means propelling, guiding, and shearing the cloth, detecting means adapted to enter between the end of one piece of cloth and the beginning of the next piece attached thereto, and means suspending the shearing operation in response to such entry of the detecting means between the two pieces of cloth.

2. In a cloth shear, in combination, means propelling and guiding the cloth, shearing means, detecting means entering between the end of one piece of cloth and the beginning of the next succeeding piece connected thereto, and means controlled by the detecting means moving the shearing means out of shearing relation with the cloth as the said ends pass the shearing means.

3. In a cloth shear, in combination, means propelling and guiding the cloth, shearing means, devices moving the shearing means out of and into shearing relation to the cloth, and detecting means bearing against a surface of the cloth and actuating such devices to move the shearing means out of shearing relation after such detecting means is allowed to pass through the plane of travel of the cloth by reason of an interruption of the continuity of the cloth.

4. In a cloth shear, in combination, means propelling and guiding the cloth, shearing means, devices moving the shearing means out of and into shearing relation to the cloth, feeler means pressing against one surface of the cloth, and a member located at the other surface of the cloth engaged by the feeler means when the continuity of the intervening cloth is interrupted, such engagement causing the actuation of the devices for moving the shearing means out of shearing relation.

5. In a cloth shear, in combination, means propelling and guiding the cloth, shearing means, devices moving the shearing means out of and into shearing relation to the cloth, feeler means pressing against one surface of the cloth, a member located at the other surface of the cloth engaged by the feeler means when the continuity of the intervening cloth is interrupted, and an electrical circuit closed by such engagement to actuate the devices for moving the shearing means out of shearing relation.

6. In a cloth shear, in combination, means propelling and guiding the cloth, shearing means, devices moving the shearing means out of and into shearing relation with the cloth, and electrical-circuit-closing means operating to transmit an actuating impulse to the devices moving the shearing means out of shearing relation when the end of a piece of cloth being shorn and attached in spaced relation to the beginning of a following piece of cloth passes by the circuit-closing means to create a gap in the continuity of the cloth bringing the circuit-closing means into action.

7. In a cloth shear, in combination, means propelling and guiding the cloth, shearing means, devices moving the shearing means out of and into shearing relation with the cloth, an electrical circuit actuating the moving devices for the shearing means, and means transmitting an electrical current in a course intersecting the path of travel of the cloth when the end of the latter passes by such transmitting means.

8. In a cloth shear, in combination, means propelling and guiding the cloth, shearing means, devices suspending the shearing action of the shearing means, an electrical circuit actuating the suspending devices when closed and normally held open by the intervening cloth, and means brought into operation by the traveling cloth to close the circuit at a predetermined point in the travel of the cloth.

9. In a cloth shear, in combination, means for propelling and guiding the cloth, shearing means shearing the cloth, devices suspending the shearing action of such shearing means, an electrical circuit actuating such devices to suspend the shearing when closed, and including conducting elements at opposite surfaces of the traveling cloth and intermediate the latter's width, and means brought into action by the traveling cloth at a predetermined point in its travel to complete an electrical connection between the said elements through the path of travel of the cloth and thus to close the circuit.

10. In a cloth shear, in combination, means for propelling and guiding the cloth, shearing means, devices suspending the shearing action of such shearing means, an electrical circuit actuating such devices to suspend the shearing when closed, and including opposed rolls located respectively at opposite surfaces of the cloth, and means brought into action by the traveling cloth to complete an electrical connection between the two rolls and thus to close the circuit.

11. In a cloth shear, in combination, means for propelling and guiding the cloth, shearing means, devices suspending the shearing action of such shearing means, an electrical circuit actuating such devices to suspend the shearing when closed, and including a conducting surface at one face of the cloth, and yielding contact members bearing against the other face of the cloth and making contact with the conducting surface to close the circuit when the end of the cloth passes from between the surface and one or more of the contact members.

12. In a cloth shear, in combination, means for propelling and guiding the cloth, shearing means, devices suspending the shearing action of such shearing means, an electrical circuit actuating such devices to suspend the shearing when closed, a roll bearing against one surface of the cloth, a second roll having resilient wires projecting from its surface in wiping contact with the other surface of the cloth at the point of contact of the cloth with the first roll, and means driving the second roll at a speed causing the wires to move over the surface of the cloth in the direction of travel of the cloth, the two rolls and the wires comprising parts of the electrical circuit and closing such circuit to suspend the shearing when a break in the continuity of the cloth permits the wires on the second roll to make contact with the first roll.

13. In the mechanical shearing of cloth, the method of detecting the approach of the junction of successive pieces of cloth which includes joining the ends of adjacent pieces of cloth in spaced and non-overlapping relation by loose stitches, and detecting the break in the continuity of the cloth resulting from such spaced relation.

14. In the mechanical shearing of cloth, the method of detecting the approach of the junction of successive pieces of cloth which includes the insertion of electrically conducting elements in the seam joining such successive pieces and the employment of such elements to close an electrical detecting circuit normally held open by the intervening non-conducting cloth as the seam approaches the shearing point.

15. In a cloth shear, in combination, means for propelling and guiding the cloth, shearing means, devices suspending the shearing action of such shearing means, an electrical circuit actuating such devices to suspend the shearing when closed, and having terminals respectively located at opposite surfaces of the cloth, and electrical conducting means borne by the cloth and joining such terminals electrically to close the circuit as such means passes between the terminals.

16. In a cloth shear, the combination of a movable support, a rotary shear member mounted thereon and normally maintained in operative shearing position by the movable support, a solenoid impelling the support and thus the shear member out of shearing position, and circuit-closing means effecting the energizing of the solenoid for this purpose, such circuit-closing means normally held open by the intervention of the cloth and extending through the path of travel of the cloth to close the circuit when the cloth ceases to intervene.

17. In a cloth shear, in combination, means for propelling and guiding the cloth, shearing means, devices suspending the shearing action of the shearing means, an electrical circuit actuating such devices to suspend the shearing when closed, and metallic thread stitched through the cloth and closing the circuit.

18. In the mechanical shearing of cloth, the method of detecting the approach of the junction of successive pieces of cloth to the shearing devices which includes the step of transmitting an impulse across the path of travel of the cloth as the tail end of a piece of cloth or a portion at a predetermined distance from such end passes the detecting point.

19. In the mechanical shearing of cloth, the method of passing the seams uniting successive pieces of cloth past the shearing devices without injury which includes the steps of connecting the successive pieces of cloth to be sheared end to end in spaced relation, and transmitting an impulse suspending the shearing operation across the path of the cloth via the space left at the tail end of a given piece after the entire piece has passed.

20. In a cloth shear, in combination, means propelling, guiding, and shearing a web of cloth composed of successive pieces united end to end by seams and having apertures in predetermined relation to such seams, means detecting such apertures and transmitting an impulse-therethrough, and means actuated by such impulse suspending the shearing action.

WILFRED N. HADLEY.